US011614353B2

(12) United States Patent
Schultheis et al.

(10) Patent No.: US 11,614,353 B2
(45) Date of Patent: Mar. 28, 2023

(54) THERMAL, FLOW MEASURING DEVICE AND ARRANGEMENT WITH A TUBE OR PIPE AND THE THERMAL, FLOW MEASURING DEVICE

(71) Applicant: Endress+Hauser Flowtec AG, Reinach (CH)

(72) Inventors: Hanno Schultheis, Hermrigen (CH); Alexander Grün, Lörrach (DE); Emioni Papadopoulou, Dornach (CH); Stephan Gaberthüel, Oberwil (CH); Martin Barth, Riehen (CH); Panagiotis Papathanasiou, Basel (CH)

(73) Assignee: Endress+Hauser Flowtec AG, Reinach (CH)

( * ) Notice: Subject to any disclaimer, the term of this patent is extended or adjusted under 35 U.S.C. 154(b) by 0 days.

(21) Appl. No.: 15/769,766

(22) PCT Filed: Sep. 8, 2016

(86) PCT No.: PCT/EP2016/071203
§ 371 (c)(1),
(2) Date: Apr. 20, 2018

(87) PCT Pub. No.: WO2017/067700
PCT Pub. Date: Apr. 27, 2017

(65) Prior Publication Data
US 2018/0313679 A1    Nov. 1, 2018

(30) Foreign Application Priority Data
Oct. 23, 2015    (DE) ..................... 10 2015 118 123.1

(51) Int. Cl.
*G01F 1/684*    (2006.01)
*G01F 15/14*    (2006.01)

(52) U.S. Cl.
CPC ............ *G01F 1/684* (2013.01); *G01F 1/6842* (2013.01); *G01F 15/14* (2013.01)

(58) Field of Classification Search
CPC ........ G01F 1/684; G01F 1/6842; G01F 15/18; G01K 1/08
See application file for complete search history.

(56) References Cited

U.S. PATENT DOCUMENTS 3,366,942 A * 1/1968 Roberta ................... G01F 1/696
340/608
3,898,638 A * 8/1975 Deane ...................... G01K 3/14
340/606

(Continued)

FOREIGN PATENT DOCUMENTS

CN    1072798 C    10/2001
CN    101398321 A    4/2009
(Continued)

OTHER PUBLICATIONS

Search Report for German Patent Application No. 10 2015 118 123.1, German Patent Office, dated Apr. 13, 2016, 7 pp.
(Continued)

*Primary Examiner* — Justin N Olamit
(74) *Attorney, Agent, or Firm* — Kelly J. Smith; Endress+Hauser (USA) Holding, Inc.

(57) ABSTRACT

A thermal flow measuring device comprising a sensor with a metal sensor housing, the sensor housing including at least a first and a second pin sleeve extending from a base, each pin sleeve having a longitudinal axis and an end face, the two pin sleeves defining a connecting axis, wherein in the first pin sleeve a first heater is arranged and in the second pin sleeve a temperature sensor is arranged, wherein the sensor housing includes at least a third pin sleeve, having a second heater, and a flow obstruction embodied such that the third pin sleeve is arranged in a first flow direction at least (Continued)

partially in the flow shadow of the flow obstruction, wherein the first flow direction extends at an angle of 80-100° to the connecting axis and lies on a plane perpendicular to the longitudinal axes of the first and second pin sleeves.

17 Claims, 3 Drawing Sheets

(56) References Cited

U.S. PATENT DOCUMENTS

| | | | | |
|---|---|---|---|---|
| 6,487,904 | B1* | 12/2002 | Myhre | G01F 1/684 |
| | | | | 73/204.12 |
| 2012/0144928 | A1 | 6/2012 | Wible et al. | |
| 2012/0209543 | A1* | 8/2012 | Pfau | G01P 13/04 |
| | | | | 702/49 |
| 2014/0352423 | A1 | 12/2014 | Kurz et al. | |
| 2015/0192442 | A1 | 7/2015 | Olin | |

FOREIGN PATENT DOCUMENTS

| | | |
|---|---|---|
| CN | 102483339 A | 5/2012 |
| CN | 103389134 A | 11/2013 |
| CN | 104053972 A | 9/2014 |
| DE | 20309694 U1 | 9/2003 |
| DE | 102007023840 A1 | 11/2008 |
| DE | 102009045956 A1 | 4/2011 |
| DE | 102013006397 A1 | 11/2013 |
| DE | 112012005695 T5 | 10/2014 |
| DE | 102015118123 A1 | 4/2017 |
| WO | 2017067700 A1 | 4/2017 |

OTHER PUBLICATIONS

Search Report for International Patent Application No. PCT/EP2016/071203, WIPO, dated Nov. 29, 2016, 12 pp.

* cited by examiner

THERMAL, FLOW MEASURING DEVICE AND ARRANGEMENT WITH A TUBE OR PIPE AND THE THERMAL, FLOW MEASURING DEVICE

CROSS-REFERENCE TO RELATED APPLICATIONS

The present application is related to and claims the priority benefit of German Patent Application No. 10 2015 118 123.1, filed Oct. 23, 2015 and International Patent Application No. PCT/EP2016/071203 filed on Sep. 8, 2016, the entire contents of which are incorporated herein by reference.

TECHNICAL FIELD

The present invention relates to a thermal, flow measuring device as defined in the preamble of claim 1 and to an arrangement with a tube or pipe and the thermal, flow measuring device.

BACKGROUND

Thermal, flow measuring devices are known, which enable a flow direction detection. Since the flow in the case of the flow measurement is most often conveyed in a tube or pipe, one distinguishes change basically between a first flow direction and an opposing, second flow direction. The flow can change between the first and the second direction, for example, in the case of a closed circular pipeline of a compressed air supply, in the case of which a back flow arises. In order to be able to specify the flow exactly, consequently, a registering of the direction is of interest.

Described in DE 10 2009 045 956 A1 and DE 10 2010 040 285 A1 are two sensor types having two additional pin sleeves equipped with heaters. A decision coefficient is ascertained, which enables a prediction of which direction the flow approaches the thermal, flow measuring device. In such case, the flow strikes always on a pin sleeve with a heater, independently of whether it approaches from the first or from the second flow direction.

SUMMARY

It is, consequently, an object of the present invention to provide a thermal, flow measuring device, which has an optimized geometry of the sensor housing, so that supplementally to the flow measurement other functionalities such as e.g. sensor drift—as well as also direction detection can be implemented.

The present invention achieves this object by a thermal, flow measuring device as defined in claim 1.

A thermal, flow measuring device of the invention includes a sensor with a metal sensor housing.

The metal sensor housing includes a hollow body for connecting to a plug-in apparatus and/or to a tube or pipe wall. A plug-in apparatus can be e.g. a framework, on whose end the aforementioned sensor housing is arranged. This framework is then inserted into the tube or pipe through an opening, which is most often located at the uppermost point of a tube or pipe with reference to the gravitational field. The wall of the sensor housing bounding on the environment is, thus, partially or completely exposed to a flow of a measured medium located in the tube or pipe. Alternatively to the plug-in apparatus, the metal sensor housing can also be affixed directly or by means of a tube or pipe lengthening securely to a tube or pipe wall. The type of seating of the sensor housing, or of the hollow body, is, however, only of subordinate meaning in the context of the present invention.

The aforementioned hollow body includes a base. This base can be, for example, flat or curved.

The sensor housing includes at least two pin sleeves, which protrude starting from the base and in the installed state protrude preferably into the interior of a tube or pipe. The pin sleeves can be embodied e.g. cylindrically or prismatically.

Each of the pin sleeves includes a first section having an end face and a lateral surface, wherein the lateral surface has a maximum separation from the longitudinal axis L of the pin sleeve. This maximum separation corresponds in the case of a cylindrical pin sleeve to the radius. In the case of a prismatic, e.g. hexagonal or octagonal, pin sleeve, the maximum separation corresponds to the separation of a corner point from the longitudinal axis in a cutting plane perpendicular to the longitudinal axis of the pin sleeve.

The two pin sleeves, e.g. their longitudinal axes, define a connecting axis. In the first pin sleeve, especially in the terminal section of this pin sleeve, a first heater is arranged and in the second pin sleeve, especially in the terminal section of this pin sleeve, a temperature sensor is arranged for ascertaining the temperature of the medium.

According to the invention, the sensor housing includes at least a third pin sleeve, in which a second heater is arranged. Furthermore, the sensor housing includes a flow obstruction, which is embodied in such a manner that the third pin sleeve, and especially the heater arranged in the pin sleeve, is in a first flow direction arranged at least partially in the flow shadow of this flow obstruction. In such case, the flow obstruction can be, for example, a flat web or also a cylindrical or prismatically embodied pin sleeve. The terminology, flow shadow, means a shed wake region and/or a recirculation region. The heater can be arranged within this region, when the sensor is flowed on from a first flow direction.

The first flow direction extends at an angle of 80-100° to the connecting axis and the first flow direction lies on a plane, which is perpendicular to the longitudinal axes of the two aforementioned sensor sleeves. Additionally arranged on this plane is the connecting axis.

By the aforementioned geometric arrangement of the first and second, as well as the third pin sleeves and the flow obstruction, a sensor drift determination can be performed for the first heater by reconciliation with the second heater and, at the same time, a detecting of the flow direction can occur, thus the direction in which the measured medium is flowing through the tube or pipe.

Advantageous embodiments are subject matter of the dependent claims.

Advantageously, the pin sleeves and the flow obstruction are arranged in such a manner that the sensor housing has a mirror symmetric construction, with a first symmetry plane, which is arranged perpendicular to the connecting axis.

The third pin sleeve and/or the flow obstruction can advantageously be arranged protruding from the base and in parallel with the first and/or second pin sleeves.

The first and second pin sleeves can have a first length and the third pin sleeve and/or the flow obstruction a second length, which differs from the first length. Thus, the flow measurement occurs on a first plane perpendicular to the longitudinal axes of the first and/or second pin sleeve and the direction detection on a second plane perpendicular to one or more longitudinal axes. The height shift assures that the heat input of the second heater does not disturb the flow measurement at the first and second pin sleeves.

It is especially advantageous that the first heater in the first and/or second pin sleeve and the second heater in the third pin sleeve define heating areas on the outer wall, wherein lengths of the first and second pin sleeves differ from the length of the third pin sleeve by at least the length of a heating area.

Especially preferably, the flow obstruction includes at least one element, which has a same outer contour as the third pin sleeve. In this way, the sensor can be calibrated independently of the flow direction.

Advantageously, the flow obstruction includes at least one web, which is arranged between the first and second pin sleeves and which lies on or in parallel with a plane, which is defined by a longitudinal axis of the first pin sleeve and the connecting axis.

For improved flow guidance, the web can advantageously have a slot.

The flow obstruction and the third pin sleeve are advantageously arranged in such a manner that the sensor housing has a second symmetry plane, which is arranged perpendicular to the first symmetry plane.

An arrangement of the invention includes a pipe or tube, which is flowed through by a measured medium in a first flow direction and a thermal, flow measuring device of the invention, which is arranged on or in the pipe or tube.

In the following, other advantageous embodiments of the invention will now be described.

The first, second, third and/or fourth pin sleeves can each advantageously have an end section with a lateral surface, which has a maximum separation dl about its longitudinal axis. Additionally, the pin sleeves can have an additional section, which preferably transfers into the base, and which has a lateral surface, which has a maximum separation d2 about its longitudinal axis. In the case of a frustoconically shaped, lateral surface, the maximum separation corresponds to the greatest radius of the lateral surface, which usually at the same time forms the fictive base of the frustum. This base, of course, does not exist, since the sleeve of the sensor housing is hollow all the way through, so that a temperature sensor at the time of assembly of the thermal, flow measuring device is introducible via the hollow body and a terminal opening of the pin sleeve into its pin-shaped lateral surface and can be led, or threaded, into the first section. This stepped construction increases the eigenfrequency of the pin sleeves.

The first section can advantageously have a cylindrical lateral surface. In this way, compared to a cone shaped lateral surface, an especially good coupling of a heater or a temperature sensor with the inner surface of the pin sleeve can occur. The coupling can preferably occur by means of a copper bridge, such as described, for example, in DE 10 2008 015 359 A1.

In order that the individual sensor elements are especially well thermally decoupled and also produce only low flow turbulence, the maximum inner diameter of the first section is advantageously less than or equal to 4 mm, preferably less than or equal to 3 mm. Exactly in the case of these small diameters, there occur in the case of non-stepped pin sleeves, however, lower eigenfrequencies. These eigenfrequencies are advantageously increased by the stepped shape of the small, pin shaped, tubular sleeves of the invention.

Each of the pin sleeves includes advantageously a terminal section with a medium-contacting end face. Arranged in the first pin sleeve, especially in the terminal section of this pin sleeve, is a heater and in the second pin sleeve, especially in the terminal section of this pin sleeve, is a temperature sensor for ascertaining the temperature of the medium. Certainly other heaters and/or further temperature sensors can be arranged in other pin sleeves. The heater and the temperature sensor serve typically for flow measurement.

Advantageously, the other section of the pin sleeve has a frustoconical-shaped, lateral surface. By conical embodiment of the section arranged toward the hollow body, supplementally, the eigenfrequency the pin sleeves is increased.

Advantageously, each of the pin sleeves has at least in the terminal section a wall thickness of less than 0.5 mm, preferably between 0.1-0.4 mm. The small wall thickness enables a very direct and fast heat transfer to the measured medium. In this way, fast response times of the sensor in the case of change of flow velocity of the measured medium are enabled. Thin pin sleeves also supplementally decreases the eigenfrequency of the pin sleeves. This is, however, compensated by the stepped shape of the pin sleeves of the invention.

The wall thickness varies advantageously at least in the region of the terminal section by less than 20%, preferably by less than 10%. In this way, an as uniform as possible heat distribution is achieved along the pin sleeves.

For stability under pressure and chemical stability, the sensor housing is advantageously composed of steel and/or titanium and/or Hastelloy.

The metal sensor housing can be embodied as one piece and the pin sleeves and the hollow body can be connected together seam freely, especially weld seam freely, wherein the sensor housing is especially preferably embodied as a monolithic component. Seam free means, in the context of the present invention, that neither a weld seam nor an adhesive- or solder seam is present as connection between the pin sleeves and the hollow body. In the case of welded pin sleeves, the heat transfers change with temperature, which, in the case of a greater temperature change, can lead to a measurement error. This is, however, advantageously prevented in the case of this embodiment.

Especially advantageously, the metal sensor housing is embodied as a monolithic component. The means that the sensor housing is manufactured completely of one material. While by generative manufacturing methods also combinations of a number of metals or metal alloys, e.g. steel and titanium, are implementable, these are not preferred.

Advantageously, at least the terminal section of the pin sleeves has a cylindrical lateral surface with a diameter and the terminal section extends over a length, wherein the ratio of length to diameter is greater than or equal to five, preferably greater than or equal to seven.

For increasing the eigenfrequency, the third pin sleeve advantageously has a longitudinal axis and an end face, wherein the third pin sleeve has a first section with the end face and a lateral surface, wherein the lateral surface has a maximum separation dl about the longitudinal axis, and the end face has an additional section, which transfers into the base, with a lateral surface, which has a maximum separation d2 about the longitudinal axis, wherein the maximum separation d2 of the lateral surface of the additional section is at least 20%, preferably at least 50%, greater than the maximum separation dl of the lateral surface of the first section about the longitudinal axis of the pin sleeve.

The length of the terminal section can advantageously be at least 2 mm, preferably 3-10 mm, and the total length of a pin sleeve is at least 10 mm.

The sensor housing of the flow measuring device of the invention can advantageously be produced by means of a generative manufacturing method, preferably by means of a radiation melting method. While corresponding sensor housing are also implementable via other manufacturing methods, thus e.g. by primary forming methods, especially metal injection molding, it has, however, been found that especially good manufacturing tolerances and especially thin walled components are attainable with the aforementioned preferred manufacturing methods.

BRIEF DESCRIPTION OF THE DRAWING

The invention will now be explained in greater detail based on examples of embodiments and with the help of the appended drawing. This description and the figures are by way of example and are not intended to limit the scope of protection of the present invention. The figures of the drawing show as follows.

DETAILED DESCRIPTION

Figure 1:
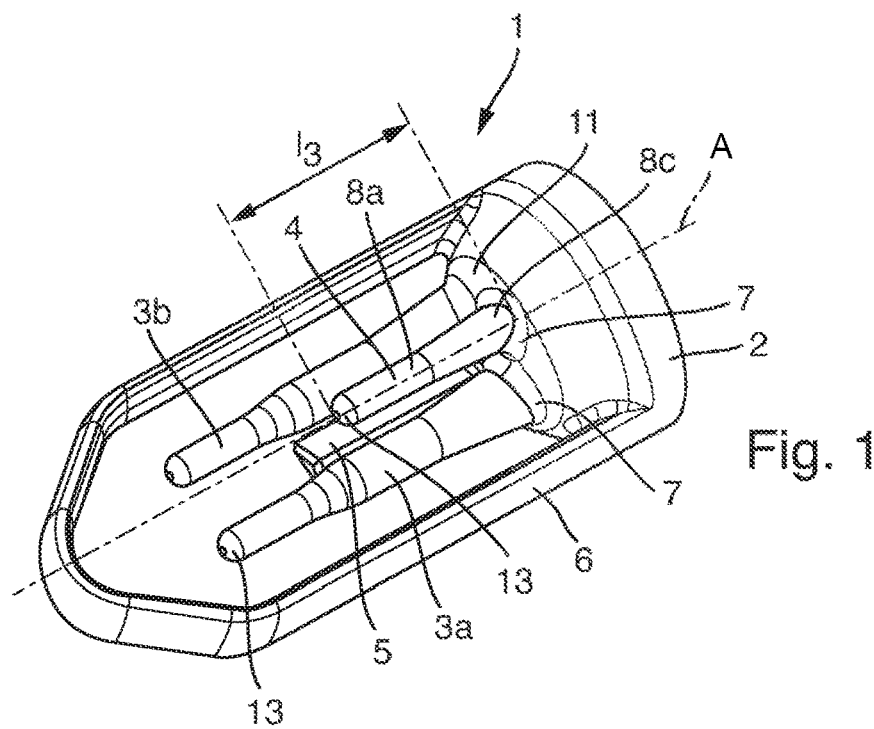
FIG. 1 shows a perspective view of a first embodiment of a sensor housing of a thermal, flow measuring device of the invention.

Conventional, thermal, flow measuring devices use usually two heatable resistance thermometers embodied as equally as possible, which are arranged in, most often, pin-shaped metal sleeves, so-called stingers or prongs, or in cylindrical metal sleeves, and which are in thermal contact with the medium flowing through a measuring tube or through the pipeline. For industrial application, the two resistance thermometers are usually installed in a measuring tube; the resistance thermometers can, however, also be directly mounted in the pipeline. One of the two resistance thermometers is a so-called active sensor element, which is heated by means of a heating unit. Provided as heating unit is either an additional resistance heater, or in the case in which the resistance thermometer is a resistance element, e.g. an RTD (Resistance Temperature Device) sensor, which is heated by conversion of an electrical power, e.g. by a corresponding variation of the measuring electrical current. In the field of thermal flow measurement, the active sensor element is also often called the heater. The second resistance thermometer is a so-called passive sensor element: It measures the temperature of the medium.

Usually, in a thermal, flow measuring device, a heatable resistance thermometer is so heated that a fixed temperature difference is established between the two resistance thermometers. Alternatively, it is also known to supply via a control unit a constant heating power.

If there is no flow in the measuring tube, then an amount of heat constant with time is required for maintaining the specified temperature difference. If, in contrast, the medium to be measured is moving, the cooling of the heated resistance thermometer depends essentially on the mass flow of the medium flowing past it. Since the medium is colder than the heated resistance thermometer, heat is transported away from the heated resistance thermometer by the flowing medium. In order thus in the case of a flowing medium to maintain the fixed temperature difference between the two resistance thermometers, an increased heating power is required for the heated resistance thermometer. The increased heating power is a measure for the mass flow of the medium through the pipeline. The heating power can be described by a so-called power coefficient PC.

If, in contrast, a constant heating power is supplied, then the temperature difference between the two resistance thermometers lessens as a result of the flow of the medium. The particular temperature difference is then a measure for the mass flow of the medium through the pipeline or through the measuring tube, as the case may be.

There is, thus, a functional relationship between the heating energy needed for heating the resistance thermometer and the mass flow through a pipeline, or through a measuring tube, as the case may be. The dependence of the heat transfer coefficient on the mass flow of the medium through the measuring tube, or through the pipeline, is utilized in thermal, flow measuring devices for determining the mass flow. Devices, which operate on this principle, are produced and sold by the applicant under the marks, 't-switch', 't-trend' and 't-mass'.

Figure 2:
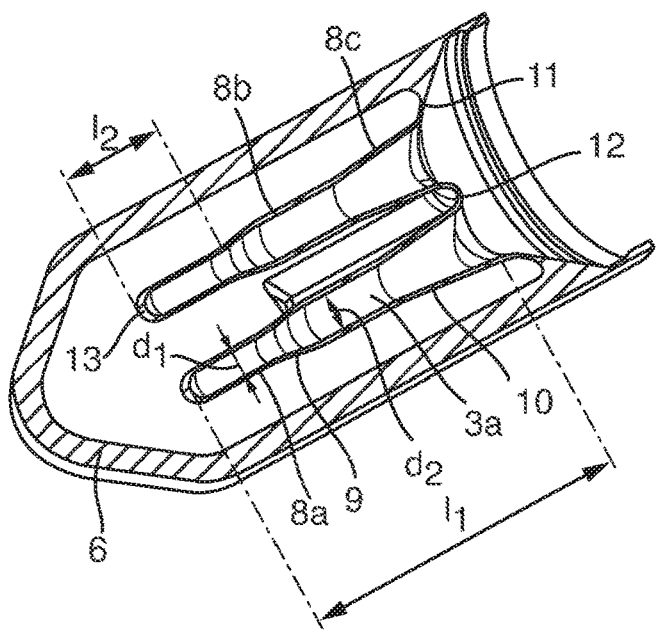
FIG. 2 shows a sectional view of the sensor housing of FIG. 1.
Figure 2A:
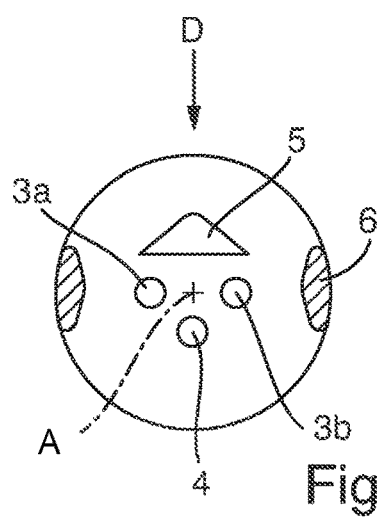
FIG. 2a shows a sectioned plan view of the sensor housing of FIG. 1.

FIGS. 1, 2 and 2a show details of a special variant of a thermal, flow measuring device. In such case, one sees especially the housing of a measuring transducer of a thermal, flow measuring device, which is referred to herein as sensor housing 1. The housing is of metal and can be embodied as a plug-in sensor or can be affixed securely, in given cases, with an intermediate piece, to the inner surface of a measuring tube.

In addition to the measuring transducer, the thermal, flow measuring device includes, of course, also an evaluation unit, which, however, for reasons of perspicuity, is not shown.

The sensor housing 1 to be described here represents only an especially preferred embodiment of the invention and is not intended to limit the scope of protection of the present invention.

Sensor housing 1 includes a hollow body 2, which can be fixed directly or via an intermediate piece to a holder of a plug-in apparatus, e.g. a plug-in rod, or to a measuring tube.

Hollow body 2 includes a plate-shaped base 11, extending from which at least two, a first and a second, pin sleeves 3a and 3b protrude into the lumen, thus into the interior of a pipe, for example, of the measuring tube.

Hollow body 2 is frustoconically shaped in the embodiment of FIGS. 1 and 2. It can, however, also have another shape, e.g. be cylindrical or truncated pyramid shaped.

Shown in FIGS. 1, 2 and 2a are a total of four pin sleeves. This variant is preferable, since with this housing form a number of functionalities, e.g. drift detection and direction detection, can be advantageously constructively united in one thermal, flow measuring device.

At the same time, the embodiment of FIGS. 1 and 2 shows that in the context of the present invention also more complicated sensor housing variants are implementable.

The present invention can in a simplified embodiment also have only the two pin sleeves 3a and 3b. The pin sleeves are connected with the hollow body as one piece and connecting seam free, especially in the connection region 12. A connecting seam in the sense of the present invention is a weld seam, adhesive seam, solder seam or the like. Especially preferably, the housing, thus the totality of pin sleeves and hollow body, is monolithically embodied.

The first and second pin sleeves 3a, 3b have, in each case, a medium-contacting end face 13. The end faces are rounded in FIGS. 1 and 2, but they can, however, also be flat.

Pin sleeves 3a and 3b can, in each case, be embodied in a stepped manner, whereby a better introduction and positioning of a heating element and/or a temperature sensor in the pin sleeves can occur through the terminal opening at the ends of the pin sleeves facing away from the medium contacting ends.

The geometric embodiment of a pin sleeve 3a or 3b is of such a character that starting from the end face 13, firstly, a first section 8a with cylindrical pin shaped sleeve wall and a first steady cylindrical surface diameter dl follows. Alternatively, the lateral surface of the first section 8a can, for example, also be embodied conically, especially frustoconically. Then, there follows a second section 8b with a cylindrical pin shaped sleeve wall and a second steady cylindrical surface diameter d2. The transitional region between the first and second sections 8a and 8b is not abrupt, but, instead, includes a continually increasing diameter from the first diameter d1 to a second diameter d2. It is in the case of a corresponding stepping 9, consequently, not an abrupt but, instead, a gradual changing of the diameter. Then, the pin sleeves enter a transitional region 10 in a third section 8c, which is embodied frustoconically shaped and in the case of which the diameter d gradually grows over the course of the frustum to a transitional region 7 to the hollow body 2. The pin sleeves 3a and 3b have a length 11 of at least 10 mm.

End face 13 is according to the definition of the present invention associated with the section 8a. Arranged in this section 8a of a first of the two pin sleeves 3a and 3b is a heating element, or heater, (not shown). This can also be e.g. a heatable resistance thermometer. The heating element does not absolutely have to contact the end face or cylinder lateral surface of its pin sleeve but, instead, can preferably be thermally coupled with the wall of its pin sleeve via a copper bridge. The same holds also for additional, optional pin sleeves. A corresponding arrangement and its advantages are described in detail in DE 10 2008 015 359 A1.

Arranged in the section 8a of a second of the two pin sleeves 3a and 3b is a temperature sensor for ascertaining the temperature of the medium. This can likewise be embodied as a heatable resistance thermometer, wherein, during operation of the thermal, flow measuring device, preferably one of the resistance thermometers can be operated actively heated and one of the resistance thermometers unheated.

The wall thickness of the pin sleeves 3a and 3b amounts at least in the section 8a to less than 0.5 mm, preferably less than or equal to 0.4 mm, especially 0.1 to 0.4 mm. Due to the thin wall thickness, an especially favorable heat transfer can be achieved.

The length 12 of this section 8a can be at least 2 mm, preferably, however, 3-10 mm.

The ratio of the length 12 for the diameter d1 for the first section 8a is preferably greater than 5, especially preferably equal to or greater than 7.

In a preferred embodiment of the invention, the average ratio $l1/d_{average\ value}$ for an entire pin sleeve amounts preferably to greater than 4, wherein the diameter always refers to the particular length of the section of the pin sleeves, in which the diameter is actually present. In the case of a frustum, such as in section 8c, an averaging of the diameter can occur.

The housing 2 is manufactured of metal. As especially preferred metal, steel can be utilized. Alternatively, e.g. for strongly-corrosive media, also titanium and/or Hastelloy can be utilized as wall material.

Additionally, the housing can be provided with a metal external coating, in order, in given cases, to increase the resistance against certain media. This external coating according to the present invention is, however, not the housing 2, but, instead, a material ply applied supplementally on the housing.

Different from the above-described basic form for a thermal, flow measuring device, the embodiment of the invention shown in FIGS. 1 and 2 includes a flow disturbance, or flow disturbing element, 5, which can be embodied as a pin sleeve or as a solid element, as well as a third pin sleeve 4.

The flow disturbance 5 exhibits compared with the first two pin sleeves 3a and 3b, at least in an end region with an end face, another geometric cross sectional shape. Especially, the end region with the end face is prismatically embodied. In the embodiment of FIGS. 1 and 2, the cross sectional shape is triangular. The flow disturbance 5 is arranged in the illustrated first flow direction D in front of the third pin sleeve 4.

The first and second sensor sleeves form a shared connecting axis. The first flow direction D is defined in such a manner that it is arranged at an angle of 80-100° to the connecting axis, on a plane, which extends perpendicular to the longitudinal axes of the two aforementioned sensor sleeves and on which the connecting axis lies. The measured medium strikes in the first flow direction, firstly, on the flow obstruction 5. The third sensor element 4 lies partially or completely in the flow shadow of this flow obstruction 5.

Depending on positioning of the sensor in the flow of medium, there can be, instead of the first flow direction D, also a second flow direction (not shown), which is opposite to the first flow direction D. In this flow direction, the third pin sleeve is directly flowed against.

The third pin sleeve 4, as arranged in such a manner and which likewise has a heater, can be utilized for direction detection.

The general method for flow direction detection is described in the documents DE 10 2009 045 956 A1 and DE 10 2010 040 285 A1, to which comprehensive reference is taken in the context of the present invention.

There occurs, in such case, the ascertaining of a decision coefficient DC based on two power coefficients, thus power coefficients PC1 and PC2. In the present case, this concerns a power coefficient PC1 for the heater in one of the pin sleeves 3a or 3b and a second power coefficient for the heater in the third pin sleeve 4. The decision coefficient is ascertained as follows: $DC=(PC2-PC1)/PC2$. By reconciliation of the decision coefficient with a limit value, it then can be decided, from which direction the flow D flows through a pipe, or measuring tube, as the case may be. Clearly, the power coefficient of the heater of the third pin sleeve will change, depending on whether the pin sleeve is located in the flow shadow of the flow obstruction 5 or whether it is directly flowed on.

As one detects from FIGS. 1 and 2, the third pin sleeve 4 has a lesser total length l3 compared with the total length of the first and second sleeves 3*a* and 3*b*. The sleeve includes, analogously to the pin sleeves 3*a*, 3*b*, an end face 13, which is associated with a first cylindrical section 8*a* of the pin sleeve 4. Following on this first section is a third section 8*c*, which is embodied conically analogously to the sleeves 3*a* and 3*b*. A second cylindrical section 8*b* is missing in the case of this pin sleeve. Arranged in this shorter third pin sleeve 4 is likewise a heater, e.g. a heatable resistance thermometer. Additionally, the flow obstruction 5 also has a lesser total length l3 than the total length l1 of the first and second pin sleeves 3*a* and 3*b*. By having different planes perpendicular to the longitudinal axes of the pin sleeves where the heaters are arranged, the flow measurement is not influenced by the direction detection.

It is understandable that the shorter, third pin sleeve 4 also has another degree of soiling. Therefore, ratio formation of e.g. the power coefficient of the heater in the first or second pin sleeve 3*a*, 3*b* with the heater in the third pin sleeve 4 can provide an estimate of the sensor drift over the operating time of the thermal, flow measuring device. In given cases, a quantifying of the sensor drift can occur and especially preferably a compensating of the sensor drift for the flow measurement.

To the extent that the flow obstruction 5 is utilized as a sensor sleeve, a heater, i.e. a heating element, preferably a heatable resistance thermometer, can also be inserted into this sensor sleeve. Just due to the different geometric shape, another soiling behavior of this pin sleeve is to be expected and therewith another sensor drift in the course of the duration of operation of the thermal, flow measuring device. For example, by forming the differences of the power coefficients of the different heating elements, these can be compared, in order to detect by what percent the differences change during measurement operation, so that sensor drift can be reliably detected and compensated.

Optionally, housing 1 can include an arch 6, which curves around the arrangement of the first and second pin sleeves 3*a*, 3*b*, the optional fourth pin sleeve 4 and the pin-shaped element 5 and is likewise connected with the hollow body 2 preferably monolithically and seam freely. This arch serves preferably as a flow guiding element.

A monolithic sensor housing with at least two correspondingly long, thin walled pin sleeves is additionally a manufacturing challenge. By means of lost wax casting, corresponding structures are manufacturable in cost- and time consuming manner. The used metal materials must also be suitable for casting. For successful lost wax casting, attention must be paid to many aspects, such as the cooling speed, and, in given cases, reworking steps for surface preparation. Similar disadvantages occur also in the case of primary forming methods, e.g. the so-called Metal Injection Molding (MIM), which basically can also be utilized in the context of the invention for manufacture of the sensor housing. A special advantage of the MIM method is a comparatively high manufacturing speed.

Especially preferred are generative manufacturing methods, such as radiation melting methods, such as e.g. selective laser melting, also known as the SLM method, in order to manufacture such objects with correspondingly thin wall thickness and corresponding length of the pin sleeves.

In the case of the SLM method, a metal powder is applied in a thin layer on a surface. The metal powder is then locally completely melted by laser radiation and solidified to a solid material layer with a coating thickness of typically 15-150 µm. Then, the surface is lowered by the magnitude of the coating thickness and a new material layer applied. In this way, the housing 1 of the measuring transducer is gradually formed. Material stresses and corrosion susceptible seam locations do not form in such case.

Figure 3:
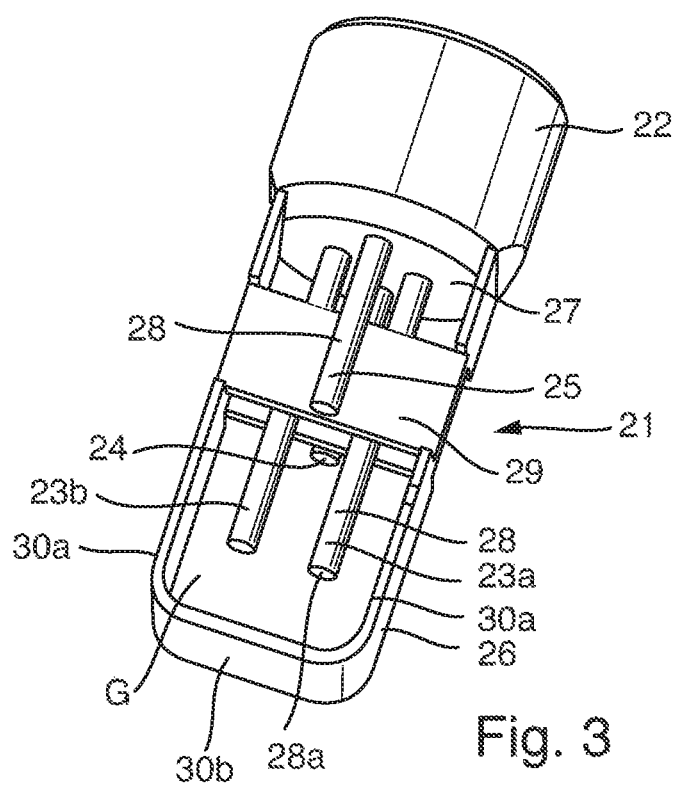
FIG. 3 shows a perspective view of a second embodiment of a sensor housing of a thermal, flow measuring device of the invention.

FIG. 3 shows a second example of an embodiment for a sensor housing 21 of a thermal, flow measuring device of the invention. Also this sensor housing includes a cylindrically embodied, hollow body 22 with a base 27, from which a total of four pin sleeves 23*a*, 23*b*, 24 and 25 protrude. First and second pin sleeves 23*a* and 23*b* have preferably the same length and likewise preferably the same shape. These two pin sleeves are embodied long, and have a comparatively thin wall thickness and a small inner sleeve cross section. Preferably, the total length of the pin sleeves 23*a*, 23*b*, analogously to the situation in FIGS. 2 and 5 and 7, amounts to at least 10 mm. The diameter of the first and/or second pin sleeve 23*a*, 23*b* amounts to less than or equal to 4 mm. Similar diameters can likewise be selected for the additional two pin sleeves, thus third and fourth pin sleeves 24 and 25, to the extent that these—as in FIG. 3—are cylindrically embodied. Otherwise, the preferred cross sectional area of the inner hollow space of the third and/or fourth pin sleeves amounts to less than or equal to 12.6 mm².

The particular sleeve cross section of the four pin sleeves 23*a*, 23*b*, 24 and 25 can preferably be cylindrically embodied. However, in less preferred embodiments of the invention, the cross-section can be three-, four-, five-, six- or n-gonal, elliptical or any other cross section.

The four pin sleeves have, in each case terminally, an end face, which in this example is embodied as a circular area. The end faces can, however, also, as in FIG. 2 and 5 or 7, be rounded or have some other shape.

Arranged in one of the first and second pin sleeves 23*a*, 23*b* in a terminal section is a heater and in the other a temperature sensor for ascertaining the temperature of the medium. These two pin sleeves serve for flow measurement according to the principle, known per se, for thermal flow measurement.

Arranged in the third pin sleeve 24 can be at least one heater.

The heater in the first and/or second pin sleeve 23*a* and 23*b* and the heater in the third pin sleeve 24 define heating areas on the outer walls. In a preferred embodiment of the invention, which holds analogously for all examples of embodiments in FIGS. 1-8, the end face of the third pin sleeve 24 and the end faces of the first and second pin sleeves 23*a*, 23*b* do not lie on the same plane. Especially preferably, the lengths of the first and second pin sleeves differ from the length of the third pin sleeve by the length of a heating area in the direction of the longitudinal axes of the pin sleeves. The four pin sleeves 23*a*, 23*b*, 24 and 25 illustrated in FIG. 3 extend preferably in parallel. By the differently elongated form of the pin sleeves, the measurement signals of the flow measurement are influenced by the heater of the third pin sleeve 24 only little or not even.

The first and second pin sleeves 23*a*, 23*b* form a connecting axis A. The sensor housing in an arrangement of the invention of the flow measuring device in or on a tube or pipe is flowed on by the medium in a flow direction D preferably at an angle α of 80-100 degree to the connecting axis A.

The third and fourth pin sleeves are preferably shorter than the first and/or second pin sleeve. The fourth pin sleeve 25 can serve only as a flow obstruction and can maintain the symmetry or can be provided with an additional heater.

The aforementioned features relative to the third and/or fourth pin sleeves are likewise transmittable to the other examples of embodiments illustrated in the figures.

FIG. 3 shows at least one supplemental, flat, plate shaped flow obstruction 29 having a a plate plane, which is parallel with a plane, which is defined by the connecting axis A of the first and second pin sleeves and the longitudinal axes L of these pin sleeves.

In practice, in FIG. 3, for structural reasons for stabilizing a flow guiding arch 26 and for ensuring symmetry, even two plate-shaped flow obstructions 29 are provided.

Different from the embodiment of FIG. 2, the example of an embodiment shown in FIG. 3 has cylindrical pin sleeves 23a, 23b, 24 and 25, which have a constant inner cross section and a constant diameter over the total lengths of the pin sleeves along the longitudinal axis. Each pin sleeve has, thus, a single section 28 with a lateral surface, which has a constant inner cross section and a constant wall thickness.

Figure 4:
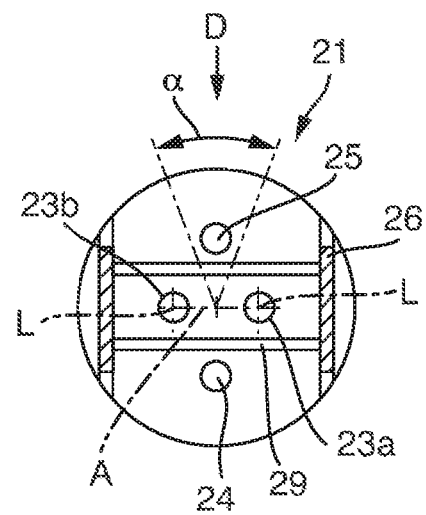
FIG. 4 shows a sectioned plan view of the sensor housing of FIG. 3.

The example of an embodiment shown in FIGS. 3 and 4 includes an arch 26, which bridges over the pin sleeves. In other words, the arch 26 defines, analogously to the situation in FIGS. 2 and 5 and 7, an inner space, and an inner hollow space, G, within which the pin sleeves 23a, 23b, 24 and 25 are arranged.

The arch 26 of FIGS. 3 and 4 represents a structural variant of a flow guiding element. The flow guiding element must, however, not absolutely be embodied as a closed arch, but, instead, can be terminally open, and thus comprise two elongated elements 30a extending in certain regions in parallel with the pin sleeves, elements which are longer than the first and/or second pin sleeve and which preferably are arranged on the same connecting axis of the two pin sleeves 23a and 23b. Especially preferably, each of the two elements has a symmetry center, which lies on the connecting axis.

Each of the two elongated elements 30a has preferably a symmetry center, which lies on the axis A. In this way, the arrangement of the sensor housing in a tube or pipe is independent of which direction the medium flows through the tube or pipe, since the flow guidance is the same in both directions. On the whole, the flow guidance enables rotation angle insensitivity, so that the flow direction D of the measured medium does not absolutely have to be at the angle of 90° to the connecting axis of the pin sleeves 23a and 23b. The flow can also strike the sensor at a certain offset at an angle of 83-97 degrees, preferably 80-100 degrees. Due to the flow guidance, no significant measurement error occurs from the angular offset, so that the securing and orienting of the sensor housing in a tube or pipe can occur with lesser labor costs.

The two elements 30a can in a less preferred embodiment of the invention also be arranged in the flow direction D before the connecting axis A of the two pin sleeves. The flow direction D relates, in such case, to an arrangement of the invention of the thermal, flow measuring device and especially of the sensor housing 21 in a pipe or tube. In this variant, it depends on the flow direction of the medium in the tube or pipe—so that a two direction flowing through of medium or an oppositely directed flow fraction, e.g. in the case of back flow, is not metrologically registrable with only two elements 30a. It is possible, however, for direction independence, to arrange an arch or at least two elements 30a before and after the connecting axis A, which are so embodied and arranged that the total arrangement of pin sleeves and flow guiding elements has a mirror symmetry about the plane, which is defined by the longitudinal axes L of the first and second pin sleeves 23a and 23b and the connecting axis A. The mirror symmetric arrangement of the flow guiding elements, or arch, enables a rotation angle insensitive and flow direction independent orientation of the sensor housing 21 in the measuring tube. The flow direction independence concerns, in such case, whether the flow in a tube or pipe is registrable only in the forward- or also in the reverse direction.

The connecting element 30b, which forms a closed arch 26 from the two elongated elements 30a, lessens undesired vibrations of the two elongated elements, vibrations which can be brought about e.g. by vibrations of the tube or pipe, in which the measuring device is secured.

The functional description of the arch with the two elongated elements 30a and the connecting element 30b can be transferred analogously to the additional examples of embodiments of FIGS. 1-8.

The variant of FIG. 3 is more susceptible to vibrations. On the whole, the pin sleeves have a lower eigenfrequency, whereby they can in the case of vibrating tubes and pipes oscillate sympathetically and bring about a measurement error.

On the other hand, the variant of FIGS. 3 and 4 is simple to manufacture, since in the case of this variant the connection between the hollow body 22 and the individual pin sleeves 23a, 23b, 24 and 25 can also be manufactured by joining and/or welding, especially by laser welding, while the examples of the embodiments of FIGS. 1 and 2, as well as 5-8, require costly manufacturing methods, such as e.g. generative manufacturing methods, form converting methods or primary forming methods, in order to connect the two aforementioned sensor elements.

Analogous advantages will become evident in the case of the connection of the arch 30 with the hollow body 22, since also this is implementable by joining- and/or welding methods.

Figure 5:
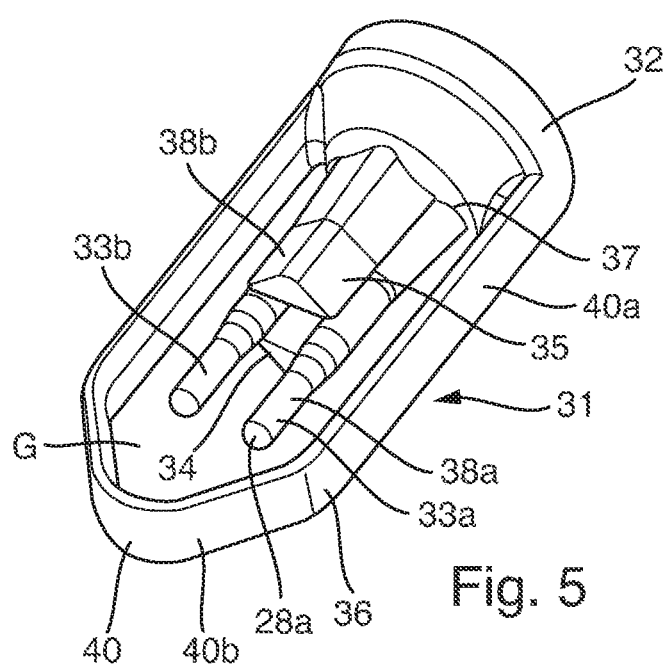
FIG. 5 shows a perspective view of a third embodiment of a sensor housing of a thermal, flow measuring device of the invention.

FIG. 5 shows a third embodiment of a sensor housing 31 of a thermal, flow measuring device of the invention. This embodiment has a hollow body 32 with a base 37, first and second pin sleeves 33a and b, in each case, with circularly shaped cross sections, as well as at least a third pin sleeve 34 and optionally a fourth pin sleeve with, in each case, triangular cross sections. The first pin sleeve 33a contains a heater, which is arranged within the pin sleeve in an end region 38a. The second pin sleeve 33b contains a temperature sensor for ascertaining the temperature of the medium. These two sensor elements enable the flow measurement. In the third and, optionally also in the fourth pin sleeve, there is, in each case, likewise a heater arranged for drift- and/or direction detection. The sensor housing of FIGS. 5 and 6 has in contrast with the variant of FIGS. 1 and 2 a mirror symmetry with reference to the external geometry of the sensor elements along a plane, which is defined by the connecting axis A between the first and second pin sleeves 23a and 23b and their longitudinal axes. In this way, the optional fourth pin sleeve represents a flow obstruction 35 for the flow of the measured medium in the flow direction D illustrated in FIG. 6.

Figure 6:
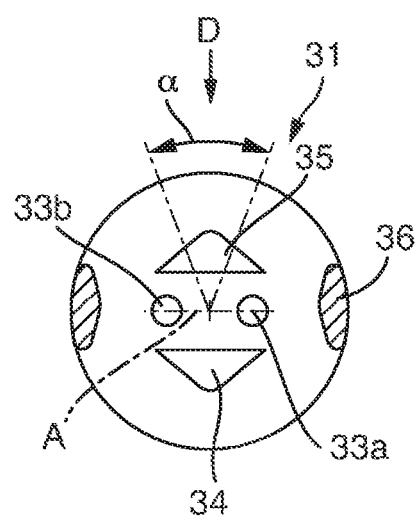
FIG. 6 shows a sectioned plan view of the sensor housing of FIG. 5.

Instead of the fourth pin sleeve 35, also a solid element can be provided as a flow obstruction 35. Geometrically, the flow obstruction 35 in the embodiment of FIGS. 5 and 6 is embodied always the same as for pin sleeve 34, at least in the end region 38b. Although the direction- and/or drift detection occurs preferably at another height or plane of the sensor housing than the flow measurement, it is possible, in the case of two sensor elements 34 and 35 of different form in the end region in the case of certain flow conditions, that measurement errors can occur in the flow measurement. In order to avoid this, it has proved advantageous that the two sensor elements for sensor drift- and/or direction detection have the same outer contour and are arranged mirror symmetrically with respect to the above-described plane.

Sensor housing 31 of FIGS. 5 and 6 also has an arch 36 with two elongated elements 40a and a preferably pointed connecting element 40b extending between the two elongated elements.

Otherwise, the sensor housing and the sensor elements, thus e.g. the pin sleeves, are geometrically embodied analogously to the situation in FIGS. 1 and 2.

Figure 7:
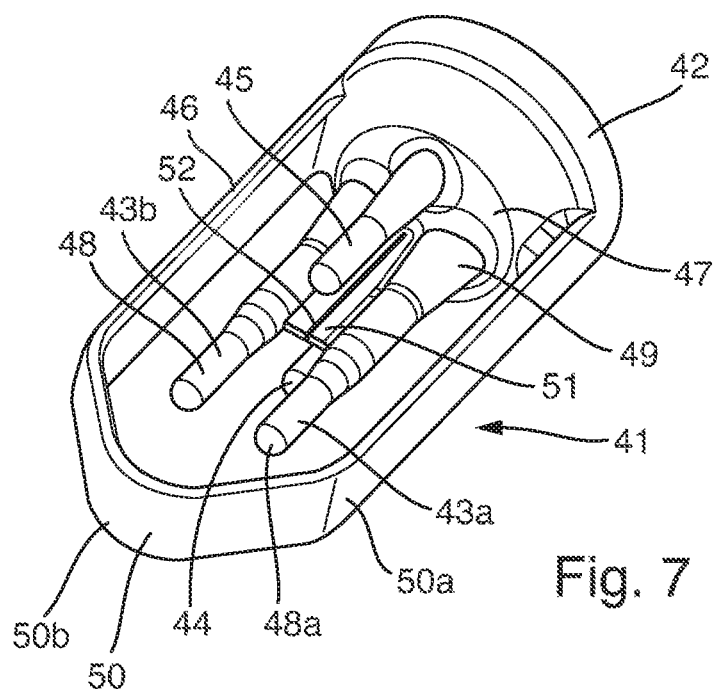
FIG. 7 shows a perspective view of a fourth embodiment of a sensor housing of a thermal, flow measuring device of the invention.
Figure 8:
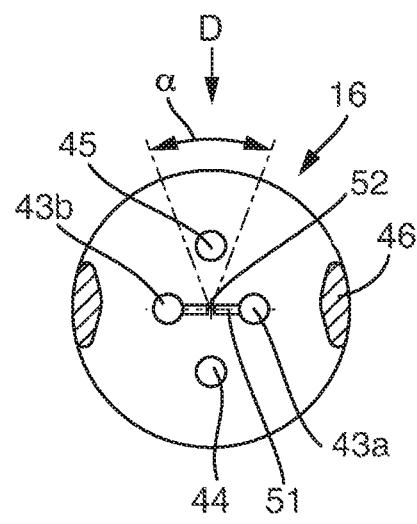
FIG. 8 shows a sectioned plan view of the sensor housing of FIG. 7.

A fourth embodiment of a sensor housing of a thermal, flow measuring device of the invention is shown in FIGS. 7 and 8.

The fourth embodiment includes the sensor housing 41 with a hollow body 42 having a base 47. First and second pin sleeves 43a and b protrude from the base 47 analogously to the situation in FIGS. 5 and 6 and include in their course parallel to the longitudinal axis a plurality of circular cross sections. Sensor housing 41 includes additionally a third pin sleeve 44 and optionally a fourth pin sleeve, which, in each case, include end regions with cylindrical side surfaces.

The first pin sleeve 43a includes a heater, which is arranged within the pin sleeve in an end region 48. The second pin sleeve 43b includes a temperature sensor for ascertaining the temperature of the medium. These two sensor elements enable the flow measurement.

In the third and, optionally also in the fourth pin sleeve, likewise heaters are arranged for drift- and/or direction detection. The sensor housing of FIGS. 7 and 8 has, in contrast with the variant of FIGS. 1 and 2, a mirror symmetry, with reference to the external geometry of the sensor elements, along a plane, which is defined by the connecting axis A between the first and second pin sleeves 43a and 43b and their longitudinal axes. In this way, the optional fourth pin sleeve represents a flow obstruction 45 for the flow of the measured medium in the flow direction D illustrated in FIG. 8.

Instead of the fourth pin sleeve, also a solid element can be provided as a flow obstruction 45. Geometrically, the flow obstruction 45 in the embodiment of FIGS. 7 and 8 is always embodied the same as the third pin sleeve 44, at least in the end region 48. Although the direction- and/or drift detection occurs preferably at another height or plane of the sensor housing than the flow measurement, it is possible, in the case of two sensor elements 44 and 45 of different form in the end region, in the case of certain flow conditions, that measurement errors can occur in the flow measurement. In order to avoid this, it has proved advantageous that the two sensor elements for sensor drift- and/or direction detection have the same outer contour and are arranged mirror symmetrically with respect to the above-described plane.

Sensor housing 41 of FIGS. 7 and 8 also includes an arch 46 with two elongated elements 50a and a preferably pointed connecting element 50b extending between the two elongated elements.

Furthermore, in contrast with FIGS. 1-6, the fourth example of an embodiment includes a web 51, which preferably is embodied as a plate shaped, flat, flow obstruction, and which preferably extends between the two pin sleeve 43a and 43b. Especially and especially preferred, the web 51 is arranged on a plane, which is defined by the longitudinal axes of the pin sleeves 43a and 43b and the connecting axis between the two pin sleeves.

In order to avoid heat transfer from one to the other sensor element in the region of the web, the plate-shaped flow obstruction, especially the web 51, includes a gap 52. This gap is preferably less than 1 mm wide.

The sensor housing and the sensor elements, thus e.g. the pin sleeves, are geometrically embodied analogously to FIGS. 1 and 2.

Preferably, the separation of the end sections 8a, 28, 38a and 48 of the first and second pin sleeves is less than 12 mm, preferably between 2-10 mm.

The invention claimed is:

1. A thermal flow measuring arrangement comprising:
a sensor with a metal sensor housing including a hollow body having a base, the hollow body adapted for connecting to a plug-in apparatus and/or a tube or pipe wall, wherein the sensor housing comprises:
a first pin sleeve and a second pin sleeve, which extend from the base and define a connecting axis therebetween, each having a longitudinal axis and a first section including an end face and a lateral surface;
a first heater disposed in the first pin sleeve;
a temperature sensor disposed in the second pin sleeve and embodied to determine a temperature of a medium surrounding the temperature sensor;
a third pin sleeve, in which a second heater is disposed; and
a flow obstruction,
wherein the third pin sleeve is arranged in a first flow direction at least partially in a flow shadow of the flow obstruction, the first flow direction extending at an angle of 80-100° to the connecting axis, wherein the first flow direction lies in a plane perpendicular to the longitudinal axes of the first pin sleeve and second pin sleeve, and wherein the connecting axis lies in the plane,
wherein the first heater and the second heater are spaced apart along a plane perpendicular to the flow direction;
wherein the first pin sleeve, the second pin sleeve and the flow obstruction are arranged such that the sensor hosing has a mirror-symmetric construction with a first symmetry plane perpendicular to the connecting axis.

2. The thermal flow measuring device of claim 1, wherein the first heater is disposed in the first section of the first pin sleeve and the temperature sensor is disposed in the first section of the second pin sleeve.

3. The thermal flow measuring device of claim 1, wherein the third pin sleeve and/or the flow obstruction extend from the base and are parallel to the first pin sleeve and/or second pin sleeve.

4. The thermal flow measuring device of claim 1, wherein each of the first pin sleeve and the second pin sleeve has a first length, and wherein the third pin sleeve and/or the flow obstruction have a second length, which differs from the first lengths of the first pin sleeve and the second pin sleeve.

5. The thermal flow measuring device of claim 4, wherein the first heater of the first pin sleeve and the second heater of the third pin sleeve define heating areas with maximum convection on respective outer walls of the first pin sleeve and third pin sleeve, wherein the first lengths of the first pin sleeve and second pin sleeve differ from a second length of the third pin sleeve by a length of at least one of the heating areas.

6. The thermal flow measuring device of claim 1, wherein the flow obstruction includes at least one element having an outer contour that is substantially the same as an outer contour of the third pin sleeve.

7. The thermal flow measuring device of claim 1, wherein the flow obstruction includes at least one web arranged between the first pin sleeve and the second pin sleeve, wherein the at least one web lies on or in parallel with a plane defined by the longitudinal axis of the first pin sleeve and the connecting axis.

8. The thermal flow measuring device of claim 7, wherein the at least one web includes a slot.

9. The thermal flow measuring device of claim 1, wherein the flow obstruction and the third pin sleeve are arranged such that the sensor housing has a second symmetry plane perpendicular to the first symmetry plane.

10. A thermal flow measuring arrangement comprising:
a tube or pipe through which a measured medium flows in a first flow direction; and
a thermal flow measuring device comprising:
   a sensor with a metal sensor housing including a hollow body having a base, the hollow body adapted for connecting to a wall of the tube or pipe, wherein the sensor housing includes:
   a first pin sleeve and a second pin sleeve, which extend from the base and define a connecting axis therebetween, each having a longitudinal axis and a first section including an end face and a lateral surface;
   a first heater disposed in the first pin sleeve;
   a temperature sensor disposed in the second pin sleeve and embodied to determine a temperature of a medium surrounding the temperature sensor;
   a third pin sleeve, in which a second heater is disposed; and
   a flow obstruction,
   wherein the third pin sleeve is arranged in a first flow direction at least partially in a flow shadow of the flow obstruction, the first flow direction extending at an angle of 80-100° to the connecting axis, wherein the first flow direction lies in a plane perpendicular to the longitudinal axes of the first pin sleeve and second pin sleeve, and wherein the connecting axis lies in the plane,
wherein the thermal flow measuring device is arranged on or in the pipe or tube;
wherein the first heater and the second heater are spaced apart along a plane perpendicular to the flow direction;
wherein the first pin sleeve, the second pin sleeve and the flow obstruction are arranged such that the sensor hosing has a mirror-symmetric construction with a first symmetry plane perpendicular to the connecting axis.

11. The thermal flow measuring arrangement of claim 10, wherein the third pin sleeve and/or the flow obstruction extend from the base and are parallel to the first pin sleeve and/or second pin sleeve.

12. The thermal flow measuring arrangement of claim 10, wherein each of the first pin sleeve and the second pin sleeve has a first length, and wherein the third pin sleeve and/or the flow obstruction have a second length, which differs from the first lengths of the first pin sleeve and the second pin sleeve.

13. The thermal flow measuring arrangement of claim 12, wherein the first heater of the first pin sleeve and the second heater of the third pin sleeve define heating areas with maximum convection on respective outer walls of the first pin sleeve and third pin sleeve, wherein the first lengths of the first pin sleeve and second pin sleeve differ from a second length of the third pin sleeve by a length of at least one of the heating areas.

14. The thermal flow measuring arrangement of claim 10, wherein the flow obstruction includes at least one element having an outer contour that is substantially the same as an outer contour of the third pin sleeve.

15. The thermal flow measuring arrangement of claim 10, wherein the flow obstruction includes at least one web arranged between the first pin sleeve and the second pin sleeve, wherein the at least one web lies on or in parallel with a plane defined by the longitudinal axis of the first pin sleeve and the connecting axis.

16. The thermal flow measuring arrangement of claim 15, wherein the at least one web includes a slot.

17. The thermal flow measuring arrangement of claim 10, wherein the flow obstruction and the third pin sleeve are arranged such that the sensor housing has a second symmetry plane perpendicular to the first symmetry plane.

* * * * *